UNITED STATES PATENT OFFICE.

CHARLES KNOX HARDING, OF CHICAGO, ILLINOIS.

STRUCTURE FOR PRODUCING FLAMELESS CATALYTIC COMBUSTION.

1,198,542.     Specification of Letters Patent.     Patented Sept. 19, 1916.

No Drawing.     Application filed March 18, 1912. Serial No. 684,636.

*To all whom it may concern:*

Be it known that I, CHARLES KNOX HARDING, a citizen of the United States, and a resident of Woodlawn, city of Chicago, county of Cook, State of Illinois, have invented certain new and useful Improvements in Structures for Producing Flameless Catalytic Combustion.

My invention relates generally to solid refractory substances which are capable of producing chemical changes in other elements, in fluid form, which are brought in contact with the surfaces of said solid substances, without producing permanent chemical changes or alterations in such solid substances; and more specifically to solid structures which produce oxidization of gaseous mixtures of oxidizable substances and gaseous oxygen containing substances when such mixtures are brought in contact with the heated solid structures; and especially when the heat of such structure is maintained by the oxidization or combustion of the gaseous mixture brought in contact therewith without flame and capable of maintaining such flameless combustion without inflaming the gaseous mixture.

In my United States Patent No. 803,534, issued October 31st, 1905, for a process and apparatus for producing combustible gaseous mixtures, I described the feeding of a liquid hydrocarbon to a surface in proximity to a heated body of a catalytic agent, mixing the hydrocarbon with air, passing the mixture in contact with the catalytic agent, thereby effecting partial combustion of the hydrocarbon and supplying heat to maintain the temperature of the catalytic agent without inflaming the mixture.

In my United States Patent No. 969,368, issued September 6th, 1910, for a process and apparatus for producing light from hydrocarbons, I described an apparatus containing a retort or heater tube through which a flowing current of a mixture of hydrocarbon and air was passed, which tube was provided with arch-like sections or blocks of catalytic material composed of any light, porous refractory material, platinized or containing any desired catalytic material, in contact with which temperatures as high as 1800° F. might be maintained by contact combustion without inflaming the flowing mixture of hydrocarbons and air.

The object of this invention is to provide an improved catalytic structure for use similar to that in the above described inventions and other like apparatus, in which heat is procured by causing combustion of a moving current of a combustible gaseous mixture, localized by contact with the solid catalytic structures and maintaining contact combustion as distinguished from flame combustion by the absence of flame.

In maintaining flame combustion, the conditions are limited by the character and velocity of the flowing combustible mixtures, and partial combustion cannot be effected with an ignited mixture, because the velocity of flame propagation varies over a wide range with different combustible mixtures, and its rate of propagation is generally much less than the rate at which catalytic combustion takes place, which is almost independent of both the rate of propagation and the velocity of flow of the combustible mixture, and this flameless combustion therefore may be maintained in contact with heated catalytic bodies when the velocity of flow of the mixture is many times as great as would permit of flame combustion.

I have discovered that catalytic structures composed of the refractory oxids of elements of low specific heat and high atomic weight such as thorium or mixtures of thorium and uranium have properties which peculiarly fit them for use in apparatus for producing catalytic combustion without inflaming the mixture. It is presumed that because these elements are among those having the fewest and largest molecules for a given weight, a less quantity of heat units serve to produce a much greater intensity of temperature. Their radio active properties, or radio active properties of other elements commonly associated with them, may contribute to the advantages found in connection with their use for catalytic structures to produce combustion without inflaming the gaseous combustible.

When it is desirable to quickly secure and maintain a high temperature of the catalytic substance, the use of a larger proportion of white thorium oxid tends to reduce the color-body energy-radiating capacity. And when it is most desirable to oxidize a large quantity of combustible matter at the surface of the structure, an admixture of considerable quantities of uranium or other colored body may be used to give the structure great radiating capacity, and thus maintain the structure at a lower temperature.

I have also discovered that considerable quantities of cerium, cerium oxids and chromium oxids—the higher oxids of which form highly colored bodies—may advantageously be employed in admixture with thorium, when it is desirable to maintain the structure at a relatively low temperature as these highly colored oxids provide a gradually increasing radiating capacity with increasing quantities of oxygen reaching the catalytic surface.

The catalytic structure may be formed of any desired shape for presenting its heating surfaces for the reception of combustible gases and the radiation of heat to any adjacent surface to be acted on.

The structure may be formed by pressing or molding from mixtures of oxids, hydroxids, carbonates, benzoates or other compounds, of thorium, uranium, etc., or they may be formed by applying these elements to the superficial area of porous, refractory porcelain or other equivalent fire resisting structures.

It is obvious that structures can be made suitable for application over a wide range of conditions, as successive portions of the flowing gas may be burned at different points in contact with a series of surfaces, and the temperatures at the various points may be much lower than could be maintained with flame combustion. It is also obvious that temperature intensities much higher can be produced, than could possibly be produced by the combustion of gaseous air and oxygen in a gaseous mixture out of contact with a solid structure. It is well known that the heat of combination liberated by the union of gaseous oxygen and gaseous hydrogen or carbon, would, when applied to the gaseous products, expand them to many times their volume, and thus distribute the heat through the increased volume and diminish its temperature as compared to the liberation of heat in contact with a solid which does not relatively change its volume in proportion to the amount of heat that it receives.

A porous coating of the catalytic material may be applied to one side only, of a thin plate or tube of very porous fire clay or porcelain and the combustible mixture of gaseous hydrocarbon and air may be passed through the pores of the clay plate without ignition and burned by catalytic combustion on the coated side of said plate, or either one of the gaseous elements of the combustible mixture, such as the hydrocarbon, may be passed through the plate from one side, and the other element or the one carrying oxygen supplied to the catalytic material from the other side of said plate or tube.

Catalytic pellets of palladium begin to act on gaseous mixtures containing hydrogen at temperature below zero.

The best pellets made from colloidal platinum have to be initially heated to over one hundred degrees F.

Non-metallic structures have to be initially heated to about 800 degrees F., but it is obvious that starting means containing metals of the platinum group may be attached for use in starting such structures.

This invention relates to means for producing flameless combustion such as described in my process for burning gaseous fuel, United States Patent No. 1,067,983— issued July 22nd, 1913.

It will be understood that structures of the type to which this invention belongs and which burn gaseous fuel continuously and non-explosively and without flame will find wide application in connection with gas burning apparatus as the greatest difficulty preventing the attainment of the highest efficiency with ordinary flame combustion is the characteristically rapid or explosive propagation of flame in the otherwise most desirable mixture of gas and air. The flameless character of the combustion produced is a most desirable and essential characteristic of my improved structures.

Having now described my invention, what I claim is,—

A new article of manufacture for producing heat from gaseous fuels by catalytic combustion comprising a structure containing thorium oxid and radio active uranium oxid.

In testimony whereof, I have signed my name to this specification in the presence of two subscribing witnesses this 16th day of March, A. D. 1912.

CHARLES KNOX HARDING.

Witnesses:
CARL F. MILLER,
JAS. FINN.